(12) United States Patent
Stec et al.

(10) Patent No.: US 10,769,368 B1
(45) Date of Patent: Sep. 8, 2020

(54) EMBEDDING CALENDAR EVENTS IN SMS MESSAGES

(71) Applicant: West Corporation, Omaha, NE (US)

(72) Inventors: Kellan Stec, Omaha, NE (US); Rhonda Gibler, Council Bluffs, IA (US)

(73) Assignee: WEST CORPORATION, Omaha, NE (US)

(*) Notice: Subject to any disclaimer, the term of this patent is extended or adjusted under 35 U.S.C. 154(b) by 257 days.

(21) Appl. No.: 15/637,783

(22) Filed: Jun. 29, 2017

(51) Int. Cl.
*G06F 15/16* (2006.01)
*G06F 40/205* (2020.01)
*H04L 12/58* (2006.01)
*G06Q 10/10* (2012.01)
*G06F 16/955* (2019.01)

(52) U.S. Cl.
CPC ........ *G06F 40/205* (2020.01); *G06F 16/9566* (2019.01); *G06Q 10/1093* (2013.01); *H04L 51/18* (2013.01)

(58) Field of Classification Search
CPC ............ G06F 17/2705; G06F 16/9566; G06Q 10/107; G06Q 50/01
USPC .................................................. 709/204–206
See application file for complete search history.

(56) References Cited

U.S. PATENT DOCUMENTS

| | | | | |
|---|---|---|---|---|
| 9,286,935 | B1* | 3/2016 | Wilder | G06F 3/0481 |
| 2004/0187076 | A1* | 9/2004 | Ki | H04L 29/06 715/208 |
| 2009/0327065 | A1* | 12/2009 | Mayblum | G06Q 10/0637 705/14.25 |
| 2011/0035284 | A1* | 2/2011 | Moshfeghi | G06Q 30/02 705/14.58 |
| 2011/0153380 | A1* | 6/2011 | Velusamy | G06Q 10/1095 705/7.19 |
| 2012/0265758 | A1* | 10/2012 | Han | G06F 16/44 707/737 |
| 2013/0091224 | A1* | 4/2013 | Chakra | G06Q 10/107 709/206 |
| 2015/0347979 | A1* | 12/2015 | Fasen | G06Q 10/1095 705/7.19 |

* cited by examiner

*Primary Examiner* — David R Lazaro
*Assistant Examiner* — Mariegeorges A Henry

(57) ABSTRACT

A method comprises, receiving a text of an SMS message, parsing a description, date, time and location of appointment from the SMS message, sending the description, date, time and location of appointment to a URL shortener and redirector and appending the shortened and redirected URL to the SMS message.

20 Claims, 12 Drawing Sheets

620

US 10,769,368 B1

EMBEDDING CALENDAR EVENTS IN SMS MESSAGES

FIELD

This disclosure relates to embedding information within short message service (SMS) messages, and more specifically to embedding calendaring events as a shortened universal resource locator (URL).

BACKGROUND

Event-type notifications may be sent to customers. Scheduling a technician for an appointment with a customer may take many characters and SMS is restricted in total to 160. What is sought is to hyperlink a scheduled location and event for a customer so that the customer simply needs to access the link to receive the calendaring event.

SUMMARY

In one embodiment, a method comprises at least one of, receiving a text of an SMS message, parsing a description, date, time and location of appointment from the SMS message, sending the description, date, time and location of appointment to a URL shortener and redirector and appending the shortened and redirected URL to the SMS message.

In another embodiment, a method comprises at least one of, receiving a text of an SMS message, creating a description, date, time and location of appointment for the SMS message, sending the description, date, time and location of appointment to a URL shortener and redirector and appending the shortened and redirected URL to the SMS message.

In a further embodiment a non-transitory computer readable storage medium configured to store instructions that when executed causes a processor to perform at least one of: receiving a text of an SMS message, parsing a description, date, time and location of appointment from the SMS message, sending the description, date, time and location of appointment to a URL shortener and redirector and appending the shortened and redirected URL to the SMS message.

In yet a further embodiment a non-transitory computer readable storage medium configured to store instructions that when executed causes a processor to perform at least one of: receiving a text of an SMS message, creating a description, date, time and location of appointment for the SMS message, sending the description, date, time and location of appointment to a URL shortener and redirector and appending the shortened and redirected URL to the SMS message.

DETAILED DESCRIPTION

Figure 1:
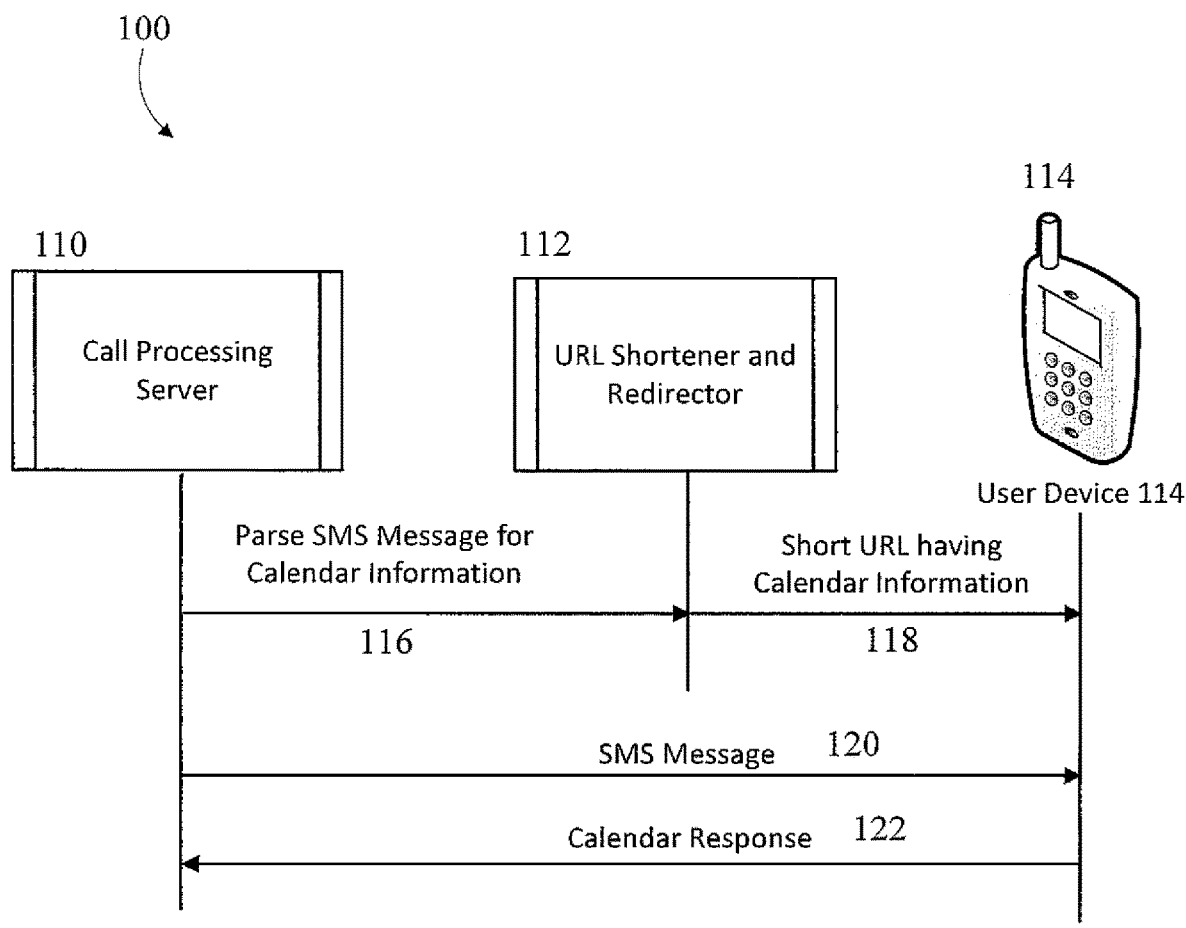
FIG. 1 illustrates an example communication flow diagram for practicing an embodiment of the disclosure.

It will be readily understood that the components of the present disclosure, as generally described and illustrated in the figures herein, may be arranged and designed in a wide variety of different configurations. Thus, the following detailed description of the examples of a method, apparatus, and system, as represented in the attached figures, is not intended to limit the scope of the disclosure as claimed, but is merely representative of selected examples of the disclosure.

The features, structures, or characteristics of the disclosure described throughout this specification may be combined in any suitable manner in one or more examples. For example, the usage of the phrases "examples", "some examples", or other similar language, throughout this specification refers to the fact that a particular feature, structure, or characteristic described in connection with the example may be included in at least one example of the present disclosure. Thus, appearances of the phrases "examples", "in some examples", "in other examples", or other similar language, throughout this specification do not necessarily refer to the same group of examples, and the described features, structures, or characteristics may be combined in any suitable manner in one or more examples.

The disclosure provides a wireless user device. The device may be a computer, laptop, mobile, wireless or cellular phone, a personal digital assistant (PDA), a tablet, a client a server or any device that contains a processor and/or memory, whether that processor or memory performs a function related to an example. The present disclosure may work with any device, such as a personal computer with a touch screen, a laptop with a touch screen, a personal computing tablet, a smartphone or any device with a processor and memory.

Scheduling a technician for cable service, order ready pickup reminders, appointment changes and the like via SMS currently requires many characters to define the date time and location of the service. Making it convenient for a client to receive a calendar appointment for an event is advantageous.

At present communicating by SMS a location linked to a date and time is difficult given the SMS restriction of 160 characters. A way was sought to embed an event with description, start/end and location in a way that may be utilized by a simple acceptance click on the client device.

Given an event and an accompanying message, the present disclosure describes assembling a request with event parameters such as start date, end date, description and location to a web service or a multimedia messaging service (MMS) which returns a properly formatted file in accordance with rfc2445. The request and parameters may be wrapped into a short URL and appended to an SMS message that would link to a calendar application within a cell phone.

Universal Resource Locator (URL) shortening is a technique in which the URL may be made shorter and direct the user to a page on the Internet. This is done utilizing a redirect having a shortened URL which links to the web page that has a longer original URL.

FIG. 1 depicts an example communication flow diagram the three communicating entities are a call processing server 110, a URL shortener and redirector 112 and a client user device 114. In this example an SMS message is parsed for calendaring information 116 by the call processing server and the information sent to the URL shortener and redirector 112, where a short URL containing the calendaring information is appended 118 to an SMS message 120. In response a calendar notification 122 is sent to the call processing server 110.

Figure 2:
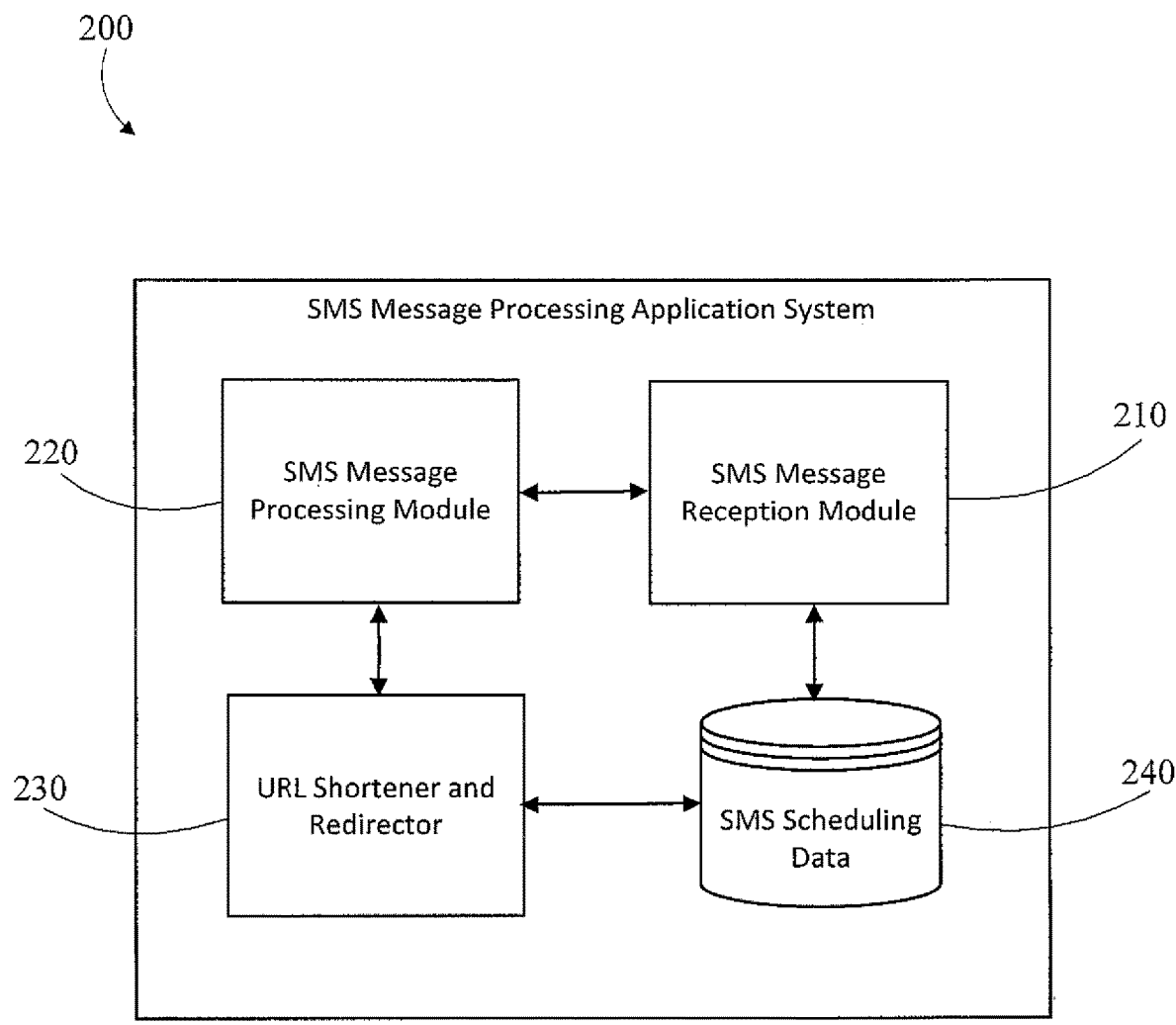
FIG. 2 illustrates an example message processing system configuration suitable for practicing an embodiment of the disclosure.

FIG. 2 illustrates an example system configuration for processing and performing one or more operations associated with the SMS message processing examples. Referring to FIG. 2, the SMS message processing application system 200 may receive at least one message from a user device at the SMS message reception module 210, and process the content of the message via the SMS message processing module 220 to determine whether the message contains a time, date and location. If a time, date and location are located within or have been created for the message a calendar event may be stored in a database 240 and a shortened URL with the calendaring information appended to the message.

The message may be a short message service (SMS) message that includes a plurality of words, images, videos etc. The processing of the content of the message may provide parsing of at least one word from the message to determine whether a calendaring event may be transmitted to the user device and a calendar event stored in a database. As a result a URL may be constructed and appended to the SMS message comprising a description, time, date and location of the scheduled event.

Identifying the received message content and processing a calendared SMS response may be based on keywords stored in memory which are matched based on a keyword comparison that includes parsing the received message words and/or phrases prior to identifying the calendaring information.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 3 illustrates an example network entity 300, which may represent any of the network components.

Figure 3:
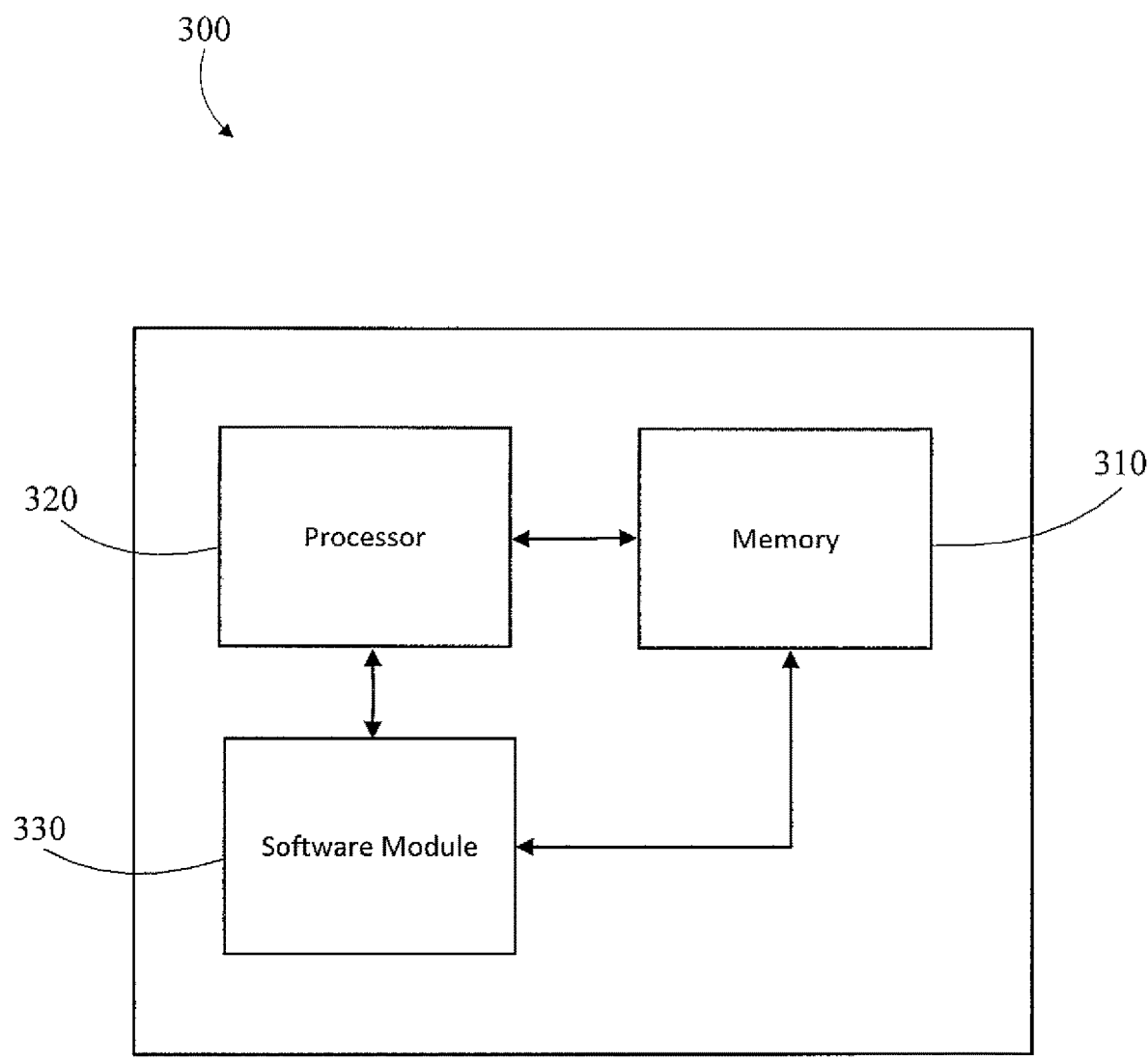
FIG. 3 illustrates an example network entity device configured to store instructions, software, and corresponding hardware for executing the same, suitable for practicing an embodiment of the disclosure.

As illustrated in FIG. 3, a memory 310 and a processor 320 may be discrete components of the network entity 300 that are used to execute an application or set of operations. The application may be coded in software in a computer language understood by the processor 320, and stored in a computer readable medium, such as, the memory 310. The computer readable medium may be a non-transitory computer readable medium that includes tangible hardware components in addition to software stored in memory. Furthermore, a software module 330 may be another discrete entity that is part of the network entity 300, and which contains software instructions that may be executed by the processor 320. In addition to the above noted components of the network entity 300, the network entity 300 may also have a transmitter and receiver pair configured to receive and transmit communication signals (not shown).

Figure 4:
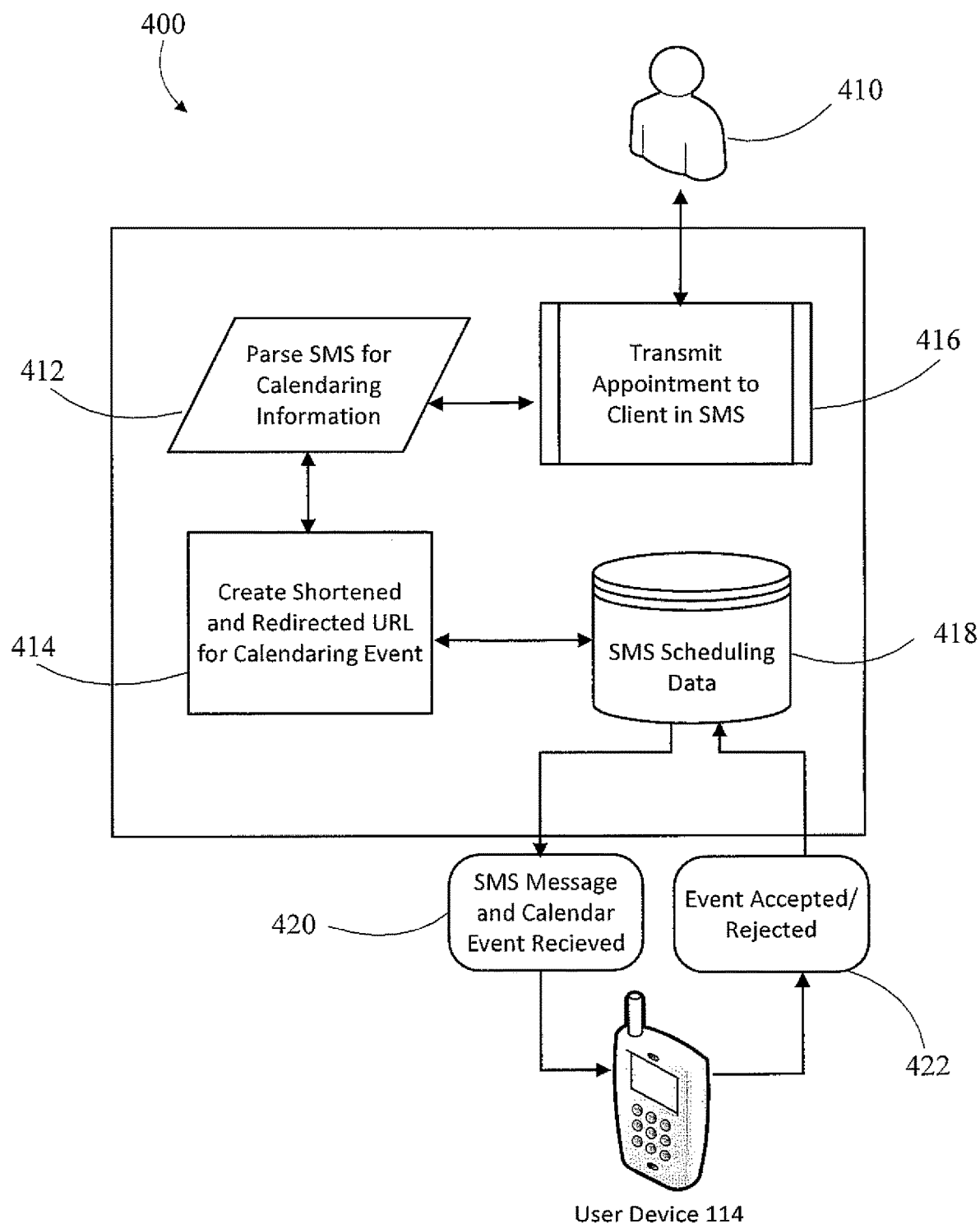
FIG. 4 illustrates a first example logic flow in accordance with an embodiment of the disclosure.

FIG. 4 depicts a first example logic flow. In this example an agent 410 interacts with a scheduling module 400, the scheduling module may be one system or a group of interconnected systems which receive, send and store calendaring information. In this example the agent 410 transmits 416 an appointment to the client in SMS. The transmission is parsed 412 to look for keywords or information regarding calendaring information and assembles that information in a format in accordance with rfc2445. The formatted calendaring information is stored in a website on the internet and a shortened and redirected URL containing the description, date, time and location is created 414. The SMS scheduling information data is stored in a database 418. The scheduling information is sent to a client user device 114 where the SMS message and calendaring event information is received 420 and the event is accepted or rejected 422.

Figure 5:
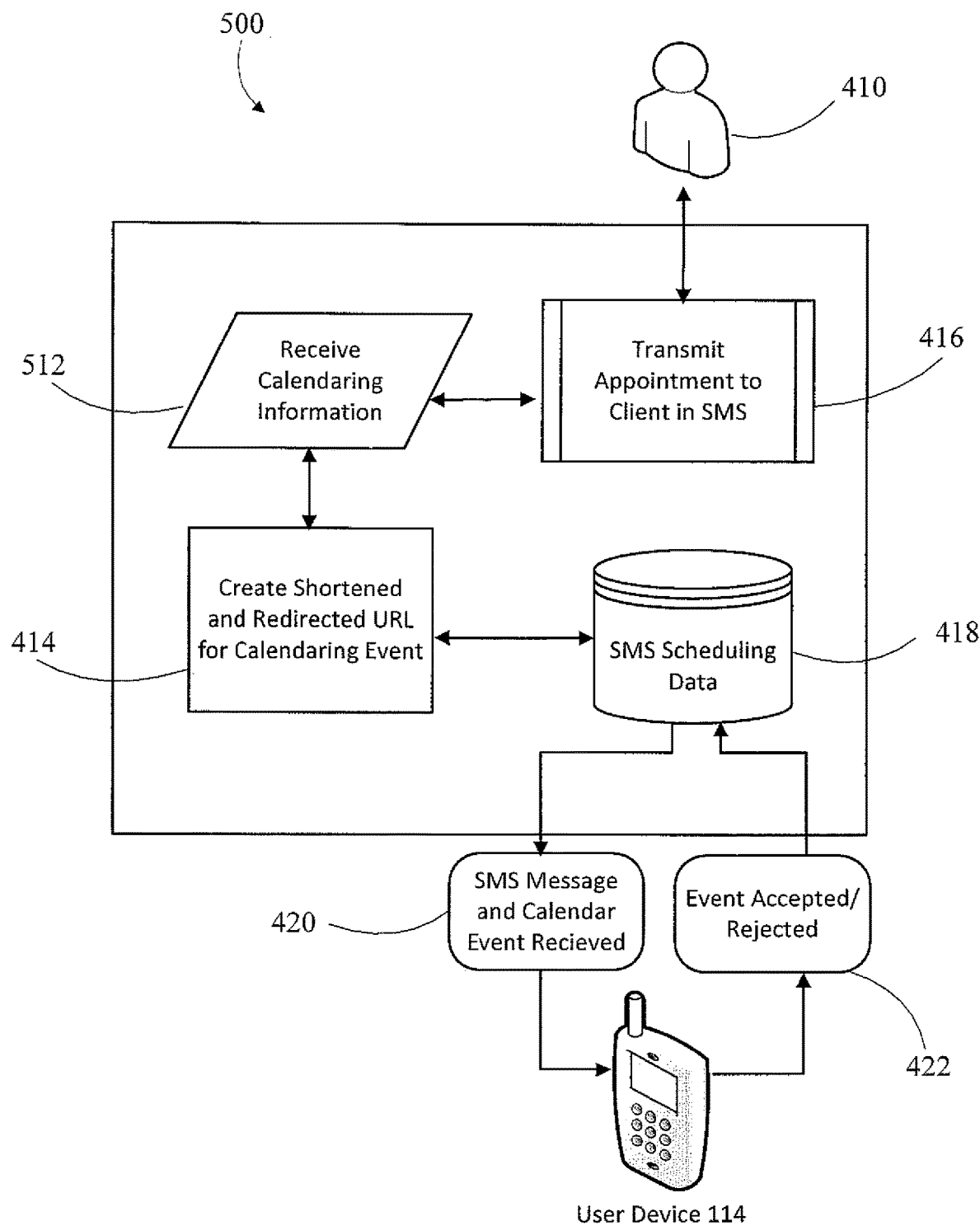
FIG. 5 illustrates a second example logic flow in accordance with an embodiment of the disclosure.

FIG. 5 depicts a second example logic flow and is a modification of FIG. 4 with the modification that calendaring information is received 512 as input directly by the agent 410. The received calendaring information being formatted such that the formatted calendaring information may be stored in a website on the internet and a shortened and redirected URL containing the description, date, time and location created 414.

Figure 6A:
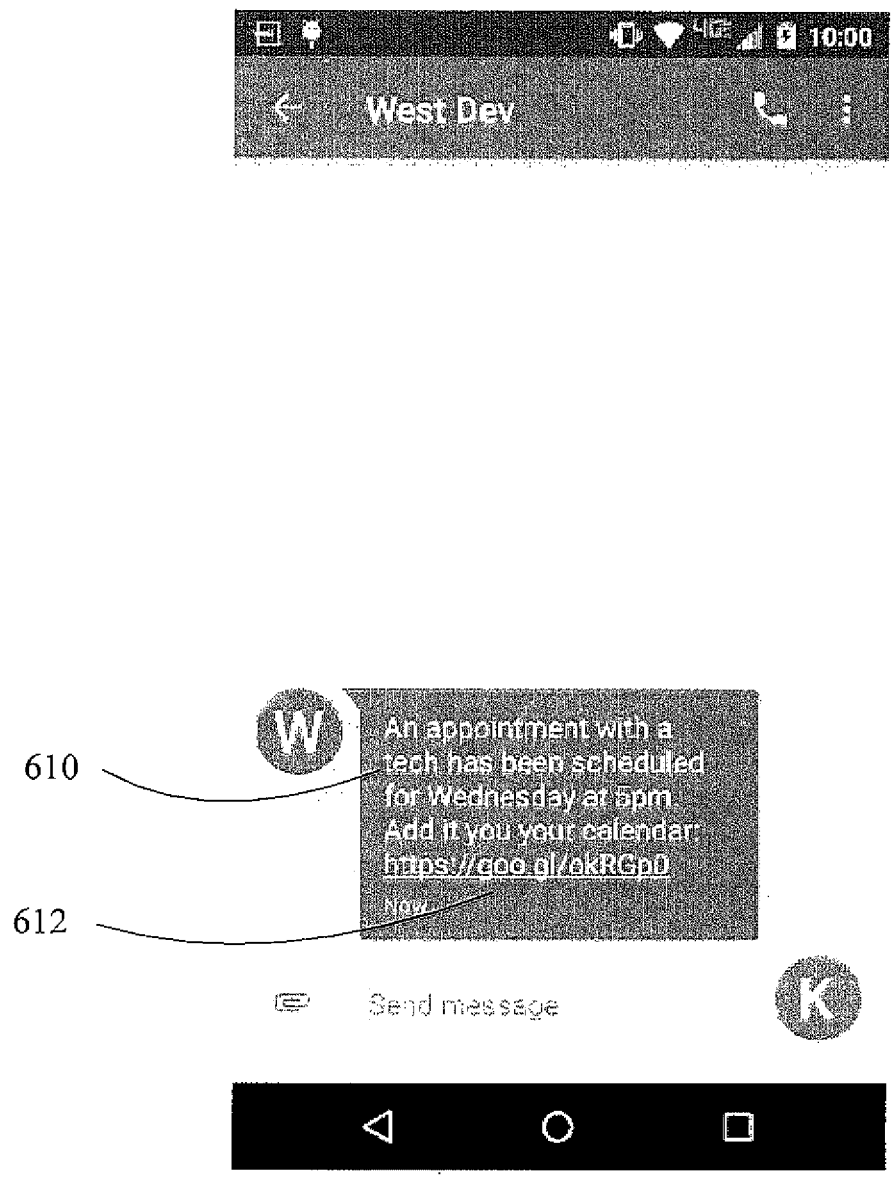
FIG. 6A illustrates a first example screenshot in accordance with an embodiment of the disclosure.

FIG. 6A depicts a first example screenshot. In this example the message has been received, the SMS message 610 has appended to it a shortened and redirected URL link 612 which contains a description, time, date and location of the upcoming appointment.

Figure 6B:
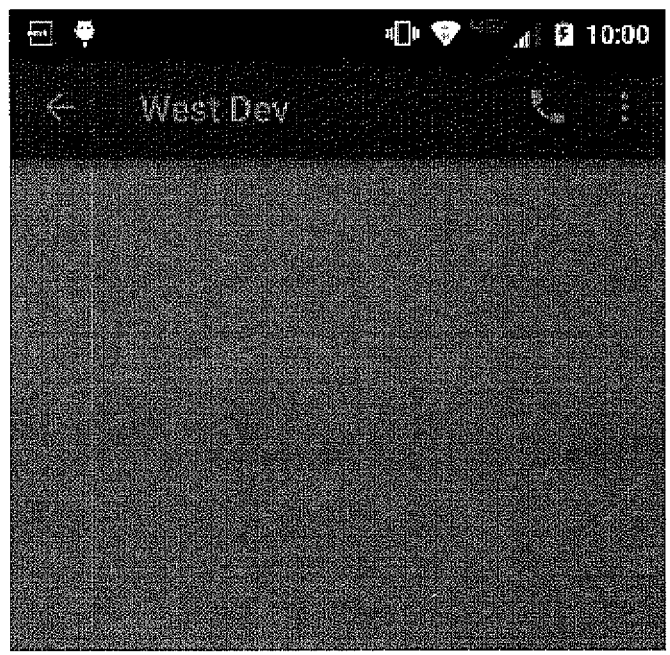
FIG. 6B illustrates a second example screenshot in accordance with an embodiment of the disclosure.
Figure 6B:
Figure 6B:
Figure 6B:
Figure 6B:

FIG. 6B depicts a second example screenshot. In this example the URL link 612 was clicked and the cell phone recognizes a calendaring event 620.

Figure 6C:
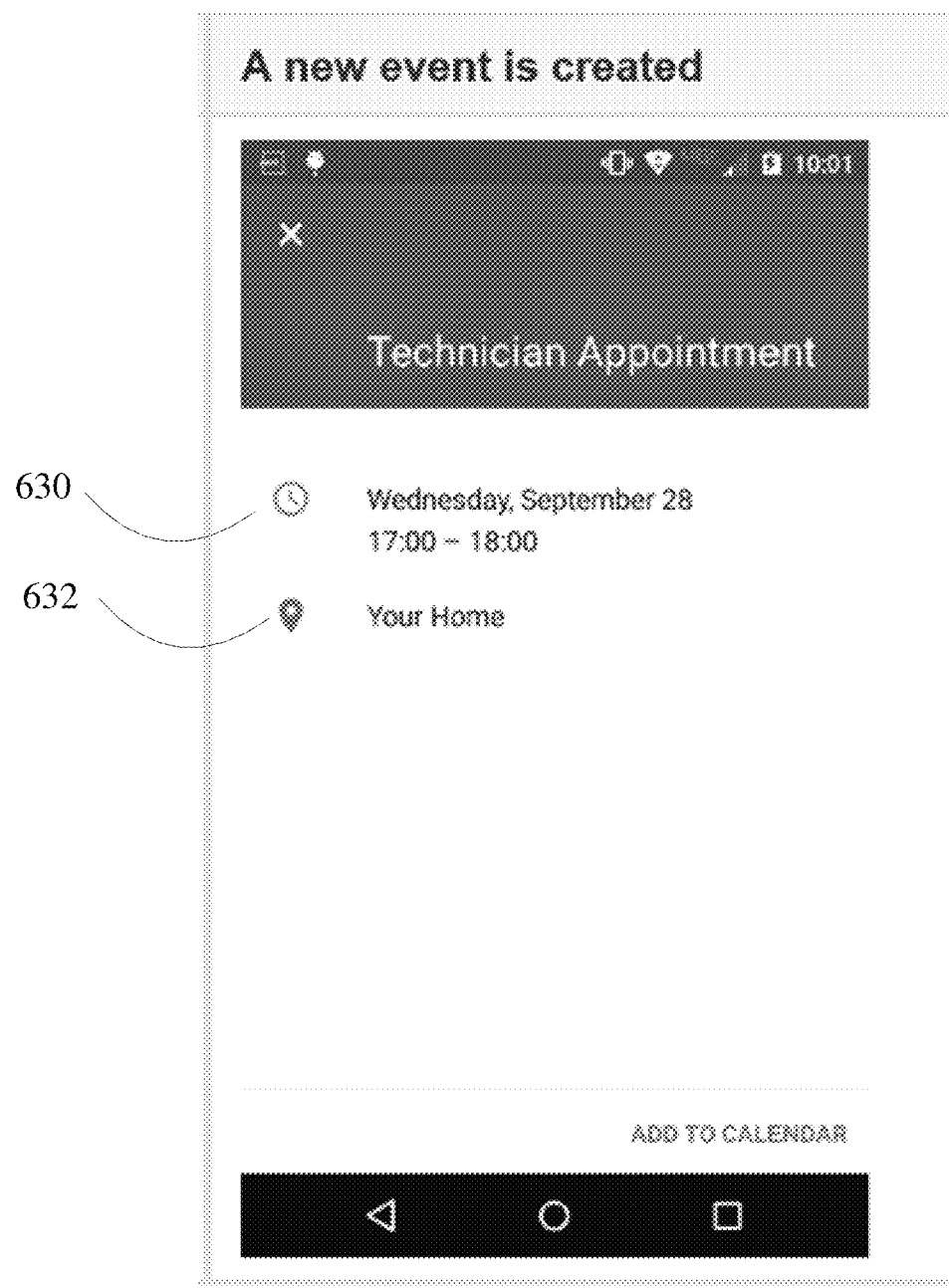
FIG. 6C illustrates a third example screenshot in accordance with an embodiment of the disclosure.

FIG. 6C depicts a third example screenshot. In this example screenshot the calendaring event has been accessed by the cell phone the date and time are shown 630 and the location 632 is also added to the appointment calendar of the client.

Figure 7:
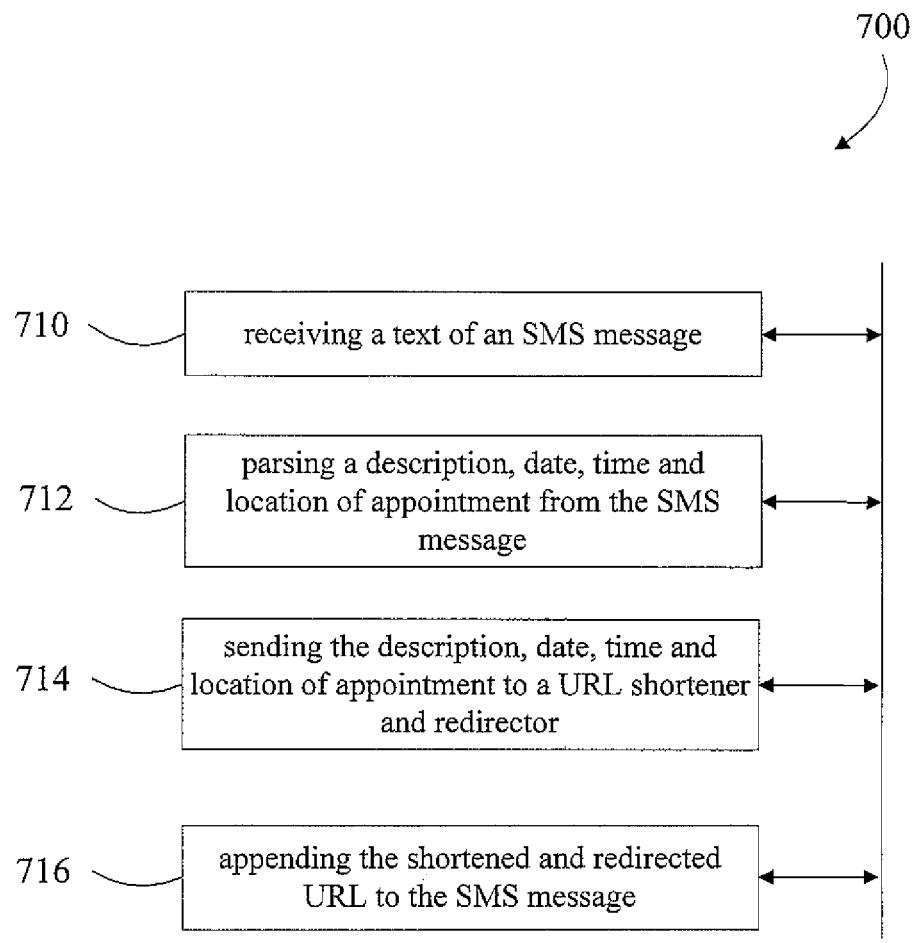
FIG. 7 illustrates a first method example in accordance with one embodiment of the disclosure.

FIG. 7 depicts a method where the SMS message is parsed to determine the constituent components of the calendaring event. The method comprises, receiving 710 a text of an SMS message, parsing 712 a description, date, time and location of appointment from the SMS message, sending 714 the description, date, time and location of appointment to a URL shortener and redirector and appending 716 the shortened and redirected URL to the SMS message.

Figure 8:
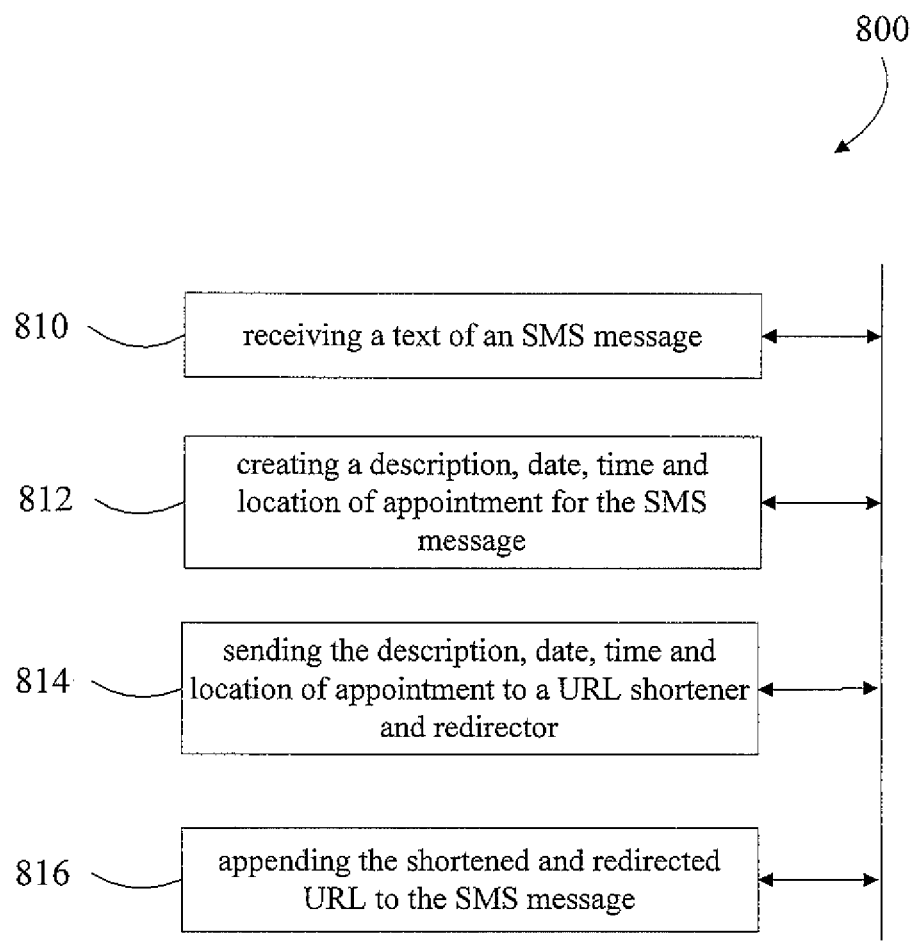
FIG. 8 illustrates a second method example in accordance with an embodiment of the disclosure.

FIG. 8 depicts a method similar to the method of FIG. 7 in which the constituent components of the calendaring even is input by the agent. In this example a method comprises, receiving 810 a text of an SMS message, creating 812 a description, date, time and location of appointment for the SMS message, sending 814 the description, date, time and location of appointment to a URL shortener and redirector and appending 816 the shortened and redirected URL to the SMS message.

Figure 9:
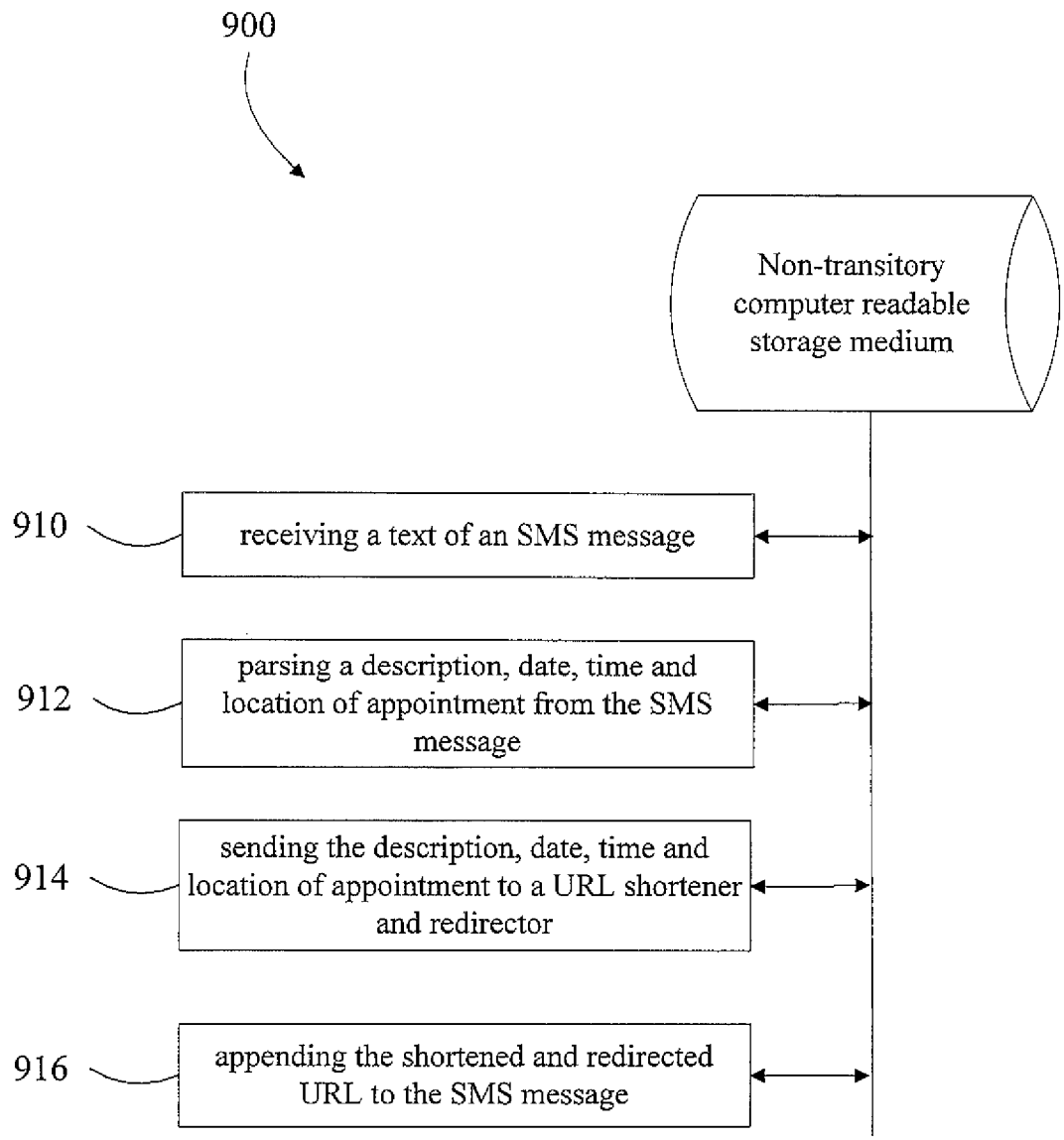
FIG. 9 illustrates a first non-transitory computer readable medium processing set example in accordance with an embodiment of the disclosure.
Figure 10:
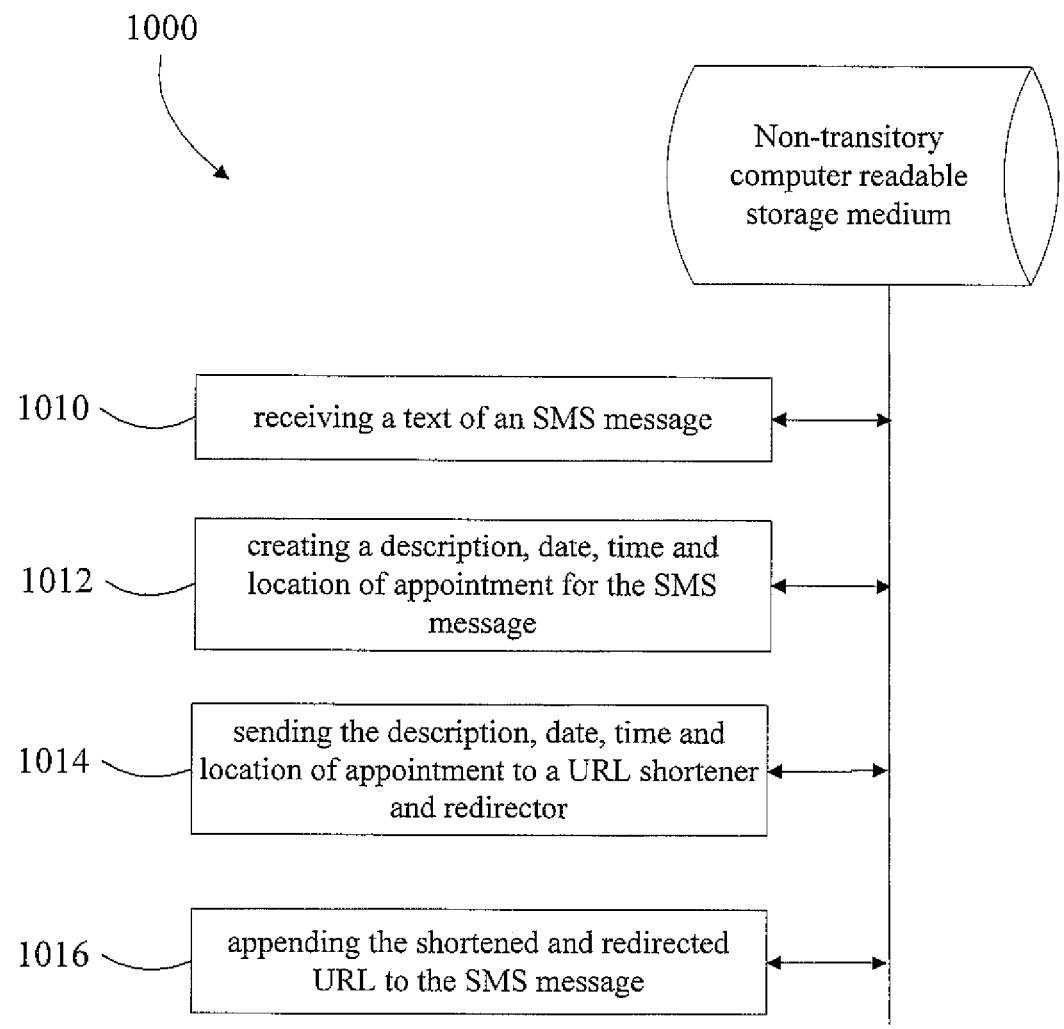
FIG. 10 illustrates a second non-transitory computer readable medium processing set example in accordance with an embodiment of the disclosure.

FIGS. 9 and 10 are non-transitory computer readable medium examples which follow the method examples of FIGS. 7 and 8.

FIG. 9 depicts a set of non-transitory computer instructions where the SMS message is parsed to determine the constituent components of the calendaring event. In this example a non-transitory computer readable storage medium configured to store instructions that when executed causes a processor to perform: receiving 910 a text of an SMS message, parsing 912 a description, date, time and location of appointment from the SMS message, sending 914 the description, date, time and location of appointment to a URL shortener and redirector and appending 916 the shortened and redirected URL to the SMS message.

FIG. 10 depicts a set of non-transitory computer instructions similar to FIG. 9 in which the constituent components of the calendaring event is input by the agent. In this example a non-transitory computer readable storage medium configured to store instructions that when executed causes a processor to perform: receiving 1010 a text of an SMS message, creating 1012 a description, date, time and location of appointment for the SMS message, sending 1014 the description, date, time and location of appointment to a URL shortener and redirector and appending 1016 the shortened and redirected URL to the SMS message.

Although an exemplary example of at least one of the method and non-transitory computer readable medium of the present disclosure has been illustrated in the accompanied drawings and described in the foregoing detailed description, it will be understood that the application is not limited to the examples disclosed, and is capable of numerous rearrangements, modifications, and substitutions without departing from the spirit or scope of the disclosure as set forth and defined by the following claims. For example, the capabilities of the systems can be performed by one or more of the modules or components described herein or in a distributed architecture.

While preferred examples of the present disclosure have been described, it is to be understood that the examples described are illustrative only and the scope of the disclosure is to be defined solely by the appended claims when considered with a full range of equivalents and modifications (e.g., protocols, hardware devices, software platforms etc.) thereto.

What is claimed is:

1. A method, comprising:
   receiving, into an SMS message processing application system, a text of an SMS message from a user that generates an appointment;
   parsing, by the SMS message processing application system, a description, date, time and location of the appointment from the SMS message;
   storing a calendar event including the description, date, time and location of the appointment in a website on the internet;
   sending, by the SMS message processing application system, the description, date, time and location of the appointment to a URL shortener and redirector;
   receiving, by the SMS message processing application system, from the URL shortener, a shortened and redirected URL that is selectable on a recipient device to cause the calendar event to be displayed and subsequently added to a calendar application on the recipient phone;
   appending, by the SMS message processing application system, the shortened and redirected URL to the SMS message; and
   transmitting, by the SMS message processing application system, the SMS message comprising the shortened and redirected URL to the recipient device.

2. The method of claim 1, wherein the parsing is performed by a web service of the SMS message processing application system.

3. The method of claim 1, wherein the sending is performed by a web service of the SMS message processing application system.

4. The method of claim 1, wherein the appending is performed by a web service of the SMS message processing application system.

5. The method of claim 1, wherein the appending is performed by a multimedia messaging service of the SMS message processing application system.

6. A method, comprising:
   receiving, into an SMS message processing application system, a text of an SMS message from a user that generates an appointment;
   creating, by the SMS message processing application system, a description, date, time and location of the appointment for the SMS message;
   storing, by the SMS message processing application system, a calendar event including the description, date, time and location of the appointment in a website on the internet;
   sending, by the SMS message processing application system, the description, date, time and location of appointment to a URL shortener and redirector;
   receiving, by the SMS message processing application system, from the URL shortener, a shortened and redirected URL that is selectable on a recipient device to cause the calendar event to be displayed and subsequently added to a calendar application on the recipient phone;
   appending, by the SMS message processing application system, the shortened and redirected URL to the SMS message; and
   transmitting, by the SMS message processing application system, the SMS message comprising the shortened and redirected URL to the recipient device.

7. The method of claim 6, wherein the creating is performed by a web service of the SMS message processing application system.

8. The method of claim 6, wherein the sending is performed by a web service of the SMS message processing application system.

9. The method of claim 6, wherein the appending is performed by a web service of the SMS message processing application system.

10. The method of claim 6, wherein the appending is performed by a multimedia messaging service of the SMS message processing application system.

11. A non-transitory computer readable storage medium configured to store instructions that when executed cause a processor to perform:
    receiving, into an SMS message processing application system, a text of an SMS message from a user that generates an appointment;

parsing, by the SMS message processing application system, a description, date, time and location of the appointment from the SMS message;

storing, by the SMS message processing application system, a calender calendar event including the description, date, time and location of the appointment in a website on the internet;

sending, by the SMS message processing application system, the description, date, time and location of the appointment to a URL shortener and redirector;

receiving, by the SMS message processing application system, from the URL shortener, a shortened and redirected URL that is selectable on a recipient device to cause the calendar event to be displayed and subsequently added to a calendar application on the recipient phone;

appending, by the SMS message processing application system, the shortened and redirected URL to the SMS message; and transmitting, by the SMS message processing application system, the SMS message comprising the shortened and redirected URL to the recipient device.

12. The non-transitory computer readable storage medium processor instructions of claim 11, wherein the parsing is performed by a web service of the SMS message processing application system.

13. The non-transitory computer readable storage medium processor instructions of claim 11, wherein the sending is performed by a web service of the SMS message processing application system.

14. The non-transitory computer readable storage medium processor instructions of claim 11, wherein the appending is performed by a web service of the SMS message processing application system.

15. The non-transitory computer readable storage medium processor instructions of claim 11, wherein the appending is performed by a multimedia messaging service of the SMS message processing application system.

16. A non-transitory computer readable storage medium configured to store instructions that when executed cause a processor to perform:

receiving, into an SMS message processing application system, a text of an SMS message from a user that generates an appointment;

creating, by the SMS message processing application system, a description, date, time and location of the appointment for the SMS message;

storing, by the SMS message processing application system, a calender event including the description, date, time and location of the appointment in a website on the internet;

sending, by the SMS message processing application system, the description, date, time and location of appointment to a URL shortener and redirector;

receiving, by the SMS message processing application system, from the URL shortener, a shortened and redirected URL that is selectable on a recipient device to cause the calendar event to be displayed and subsequently added to a calendar application on the recipient phone;

appending, by the SMS message processing application system, the shortened and redirected URL to the SMS message; and transmitting, by the SMS message processing application system, the SMS message comprising the shortened and redirected URL to the recipient device.

17. The non-transitory computer readable storage medium processor instructions of claim 16, wherein the creating is performed by a web service of the SMS message processing application system.

18. The non-transitory computer readable storage medium processor instructions of claim 16, wherein the sending is performed by a web service of the SMS message processing application system.

19. The non-transitory computer readable storage medium processor instructions of claim 16, wherein the appending is performed by a web service of the SMS message processing application system.

20. The non-transitory computer readable storage medium processor instructions of claim 16, wherein the appending is performed by a multimedia messaging service of the SMS message processing application system.

* * * * *